(12) United States Patent
Vedam et al.

(10) Patent No.: US 10,908,563 B2
(45) Date of Patent: Feb. 2, 2021

(54) ADAPTIVE MIXED INTEGER NONLINEAR PROGRAMMING FOR PROCESS MANAGEMENT

(71) Applicant: AVEVA SOFTWARE, LLC, Lake Forest, CA (US)

(72) Inventors: Rajkumar Vedam, Katy, TX (US); Detong Zhang, Houston, TX (US); Purt Tanartkit, Yorba Linda, CA (US); Gareth Hillier, Houston, TX (US); Sanjay Desai, The Woodlands, TX (US); John C. Hernandez, Katy, TX (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 16/201,565

(22) Filed: Nov. 27, 2018

(65) Prior Publication Data

US 2019/0332070 A1   Oct. 31, 2019

Related U.S. Application Data

(63) Continuation of application No. 14/984,786, filed on Dec. 30, 2015, now Pat. No. 10,152,036.

(51) Int. Cl.
*G05B 13/04* (2006.01)
*G06F 17/11* (2006.01)

(52) U.S. Cl.
CPC ............ *G05B 13/041* (2013.01); *G06F 17/11* (2013.01)

(58) Field of Classification Search
CPC .............................. G05B 13/041; G06F 17/11
See application file for complete search history.

(56) References Cited

U.S. PATENT DOCUMENTS

| | | | |
|---|---|---|---|
| 9,031,674 B2 * | 5/2015 | Rashid | E21B 43/122 700/28 |
| 10,152,036 B2 * | 12/2018 | Vedam | G06F 17/11 |
| 10,310,458 B2 * | 6/2019 | Vedam | G05B 13/041 |
| 2001/0049595 A1 * | 12/2001 | Plumer | G06Q 10/00 703/22 |
| 2004/0148264 A1 * | 7/2004 | Megan | F25J 3/04848 705/412 |
| 2012/0232875 A1 * | 9/2012 | Devereux | G06F 30/00 703/12 |
| 2016/0370772 A1 * | 12/2016 | Tanartkit | G05B 13/041 |

\* cited by examiner

*Primary Examiner* — Mark A Connolly
(74) *Attorney, Agent, or Firm* — Greenberg Traurig, LLP (57) ABSTRACT

Real-time dynamic process modeling in an online model-based process control computing environment. A solver system utilizes an oracle to implement adaptive algorithms for a mixed integer nonlinear programming (MINLP) solver and a nonlinear programming (NLP) solver.

17 Claims, 9 Drawing Sheets

ADAPTIVE MIXED INTEGER NONLINEAR PROGRAMMING FOR PROCESS MANAGEMENT

BACKGROUND

Conventional tools for continuous process optimization employ calculations designed to determine optimal operating states of continuous processes, such as refinery, chemical, or petrochemical plant operations. When an optimal decision requires the switching on or switching off of units, conventional systems and methods for continuous optimization utilize a Mixed Integer Nonlinear Programming (MINLP) solver and unit models that simulate the switching behavior of the desired process units. The MINLP solvers implemented by conventional systems and methods look for optimal solutions in all possible regions, which is complex and time-consuming. Moreover, conventional systems and methods that utilize computing devices to implement MINLP solvers are not optimized to efficiently use the processors and/or memory of the computing devices.

SimSci ROMeo, available from Schneider Electric, is a Rigorous On-line Modeling and Equation-based Optimization (ROMEO) module for continuous process optimization.

SUMMARY

Aspects of the present invention improve the fields of process control and automation and process simulation by employing online first-principles simulation techniques in conjunction with a Mixed Integer Nonlinear Programming (MINLP) solver in real-time. An oracle that comprises a solver system provides adaptive algorithms that manage infeasible solutions and enhance robustness of solutions. Aspects of the invention allow the determination of an optimal operating state while avoiding searching computationally expensive infeasible paths, generating feasible paths automatically, generating groupings automatically to reduce infeasible space, and/or reducing the search space based on initial feasibility. Aspects of the present invention also provide improvements in computer technology, namely, process model simulation and optimization.

In an aspect, a system includes one or more sensors and a control system. The sensors provide data representing a current state of each of a plurality of process units within a continuous process. The process units meet one or more demands of the continuous process. The control system receives the current state data and generates an operating state of the continuous process based on the data. The control system includes a processor executing computer-executable components. The components include a plurality of model components, a plurality of switch components, a MINLP solver component, and an oracle component. The model components implement at least one first-principle equation that represents at least one of the process units. One or more of the model components comprise a group. The switch components each comprise a corresponding one of the model components and each implement a MINLP behavior of the corresponding model component. The MINLP solver component is configured to specify a switching state from a plurality of switching states. The switching states each correspond to an operational status of the plurality of model components. The oracle component is configured to provide an infeasibility indication to the MINLP solver component as a function of the demands for indicating whether the specified switching state is infeasible.

In another aspect, a computer-implemented method generates an optimal operating state of a continuous process. The method includes a control system receiving data from at least one sensor within the continuous process. The data represents a current state of each of a plurality of process units within the continuous process. The process units meet one or more demands of the continuous process. The method also includes the control system simulating an operation of a plurality of unit models in conjunction with a MINLP solver in real-time. The unit models each represent one of the plurality of process units via at least one first-principle equation. The unit models each have a MINLP switch implementing MINLP behavior of the unit model. Each MINLP switch encodes at least one operating constraint of the continuous process. Moreover, the method includes the control system generating an infeasibility indication as a function of the demands. The infeasibility indication indicates whether a switching state of a plurality of switching states is feasible. The switching states each correspond to an operational status of the unit models.

In yet another aspect, a computer-readable storage device stores computer-executable modules that, when executed by a processor, generate an operating state of a continuous process. The modules include a plurality of model modules, a plurality of MINLP switch modules, and a solver module. The model modules each define a plurality of unit models that represent a process unit within the continuous process via at least one first-principle equation during an execution of the model module by the processor. The process unit meets at least one demand of the continuous process. The MINLP switch modules each transition a corresponding model module between an active state and an inactive state. The transitioning is based at least in part on a parameter encoding at least one operating constraint of the continuous process during an execution of the MINLP switch module by the processor. The MINLP switch modules each implement an MINLP behavior of the corresponding model module. The solver module simulates an operation of each of the model modules and the MINLP switch modules in real-time during an execution of the solver module by the processor. The simulation generates the operating state of the continuous process based on a state of the plurality of MINLP switch modules when the solver module determines the state of the plurality of MINLP switch modules is feasible as a function of the demand.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
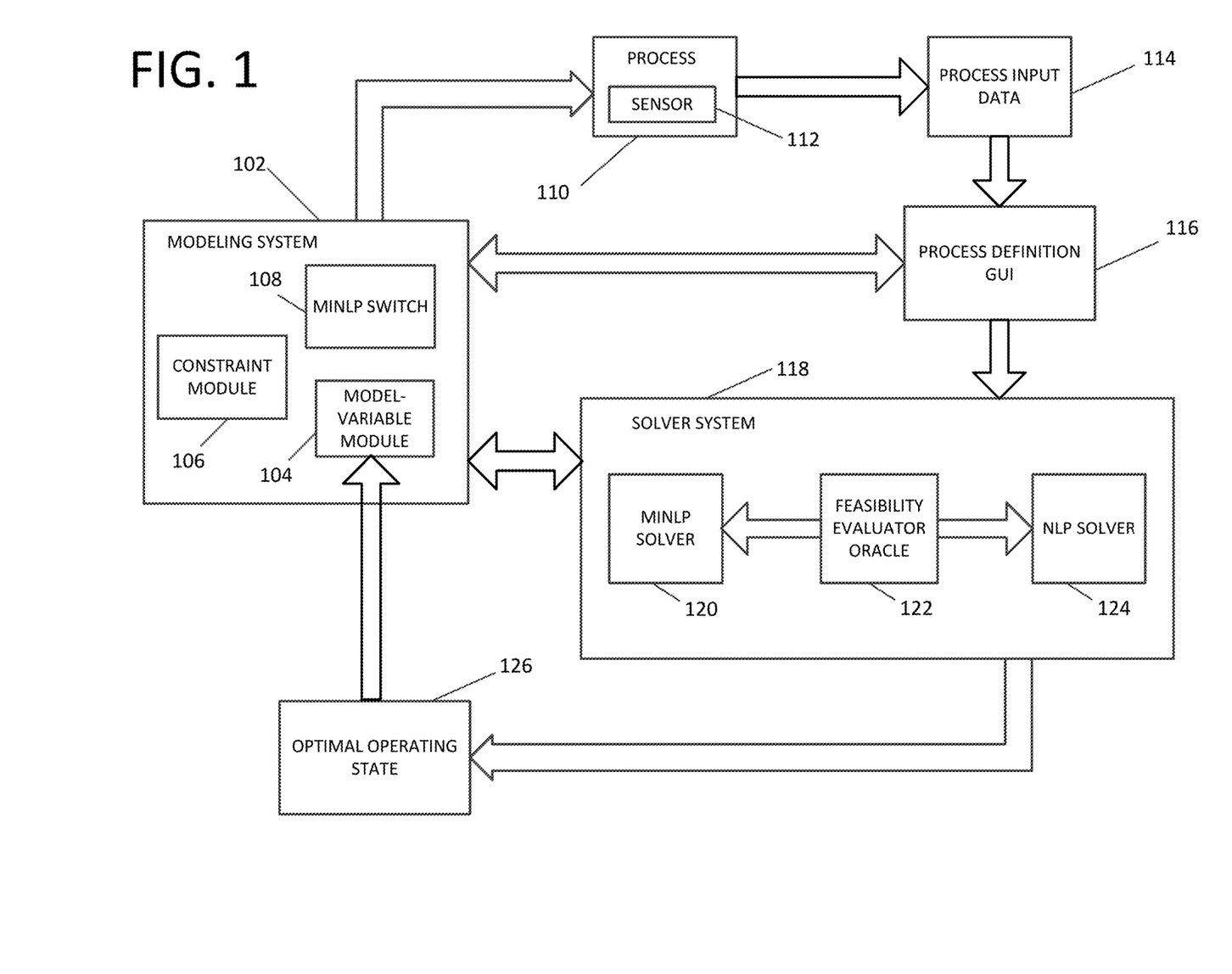
FIG. 1 is a block diagram of an exemplary ROMEO solver system embodying aspects of the invention.

Referring now to the drawings, FIG. 1 is a block diagram of a ROMEO solver system embodying aspects of the invention, including implementing Mixed Integer Nonlinear Programming (MINLP) behavior. In one form, computer-executable instructions are executed to solve a process problem by an MINLP switch in conjunction with constraints of a model that can simulate the behavior of desired process units. The illustrated system includes a modeling system 102, a model-variable module 104, a constraint module 106, an MINLP switch 108, a process 110, a sensor 112, process input data 114, a process definition interface 116, a solver system 118, a MINLP solver module 120, a feasibility evaluator oracle 122, a NLP solver 124, and an optimal operating state 126. In an embodiment, FIG. 1 illustrates an MINLP modeling system and method. Non-invasive MINLP modeling systems and methods, as described in U.S. patent application Ser. No. 14/745,961, filed Jun. 6, 2015, and hereby incorporated by reference in its entirety, may also be utilized with aspects of the present invention.

Systems and methods described herein solve nonlinear process problems while optimizing for certain considerations (e.g., operating penalty, cost, etc.) while ensuring the process meets plant constraints. Aspects of the present invention are described herein with respect to optimizing energy source usage in a continuous process but it is to be understood by one skilled in the art that the systems and methods described herein are also capable of optimizing continuous processes with respect to considerations other than energy source usage.

Energy source (e.g., utility) optimization in continuous processes involves calculating the best solution to meet the energy demand, while operating the underlying process optimally with desired operational specifications and keeping the operational expenses as low as possible. In order to perform a quantum of work in a process, there is a need for some amount of energy. The utility optimization problem is relevant when there are multiple energy sources that can supply the desired quantum of energy. For example, there may be some sources of energy endemic to the process and other sources of energy that are extraneous to the process. Utility optimization requires the capability to switch among available energy sources depending on the economics, energy and material balance, and underlying nonlinear process optimality. These computational issues require an MINLP solver in conjunction with models that can simulate the switching behavior of process units. While modeling the process for MINLP, it is advantageous to encode operational constraints of the process or plant into the model. Such constraints simplify the task for the MINLP solver by focusing the search for a solution in only the feasible regions. Grouping of units that comprise a process model as a mechanism to implement constraints for MINLP utility optimization, as described in U.S. patent application Ser. No. 14/977,785, filed Dec. 22, 2015, and hereby incorporated by reference in its entirety, may also be utilized with aspects of the present invention.

The utility optimization problem solved by aspects of the present invention can be expressed in general mathematical form. Consider a nonlinear process modeled with equality constraints $f(x,y,z)=0$, where the function f is nonlinear in the vector variables x, y, and z. Let $f: R^N \times R^S \times B^B \rightarrow R^N$, illustrating the dimension of these quantities, where typically, S<N. The variables of vector x are free-dependent and can be varied between some operational bounds of the process (e.g., of dimension N×1). The variables of vector y are free-independent variables and usually referred to as a "specification" and also varied between bounds of the process (e.g., of dimension S×1). In an embodiment, S<N. The variables of vector z are free-independent and z is the vector of integer switches in the problem. In an embodiment, variables in vector z vary between [0, 1] and is of dimension B×1. Given a cost function $c(x,y,z)$, the utility optimization problem, assuming minimization of cost, is:

$$\min_{x,y,z} c(x,y,z) \quad \text{(Equation 1)}$$

subject to
$f(x, y,z)=0$
and
$x_{min} \leq x \leq x_{max}$, $y_{min} \leq y \leq y_{max}$, and $z \in B^B$ A Rigorous Online Modeling and Equation-based Optimization (ROMEO) modeling system, as described herein, allows a user to construct a flowsheet of the process with models or units from a pre-built library or from models built by the user. These models encode the quantities f, c, x, and y in Equation 1. The ROMEO modeling system also includes plant operation constraints that specify some special structure to binary variable switching. Aspects of the present invention described herein encompass the incorporation of a feasibility evaluator oracle that provides an indication (e.g., a "yes/no" answer) of whether a switching is feasible. For example, such indication allows aspects of the present invention to prune out further switching below an infeasible switching, which increases the efficiency (e.g., percent of nodes visited for solution), performance (e.g., time to solution), and robustness (e.g., fewer failing nodes) of the ROMEO modeling system.

Referring further to FIG. 1, in an embodiment, the unit model module 102 (i.e., unit) comprises a storage memory device having stored thereon processor-executable instructions for defining a first-principle model of a unit comprising a continuous process that has been modified to implement MINLP behavior. In an exemplary embodiment, unit 102 defines a first-principle model of a motor in the process 110 and includes the model-variable module 104, the constraint module 106, and the MINLP switch 108. Additional units include, but are not limited to, generators, steam turbines, boiler fuel flows, motors, shafts, and the like. Additional details of unit 102 are further described herein and in U.S. patent application Ser. No. 14/745,961 and U.S. patent application Ser. No. 14/977,785, each incorporated by reference above.

Still referring to FIG. 1, the model-variable module 104 comprises, in an embodiment, a storage memory device having stored thereon process-executable instructions for defining a model-variable of the first-principle model of unit 102. In an exemplary embodiment, model-variable module 104 defines the shaft power of a motor as the model-variable of interest. Other model-variables include, but are not limited to, the shaft power of a generator, the actual work of a steam turbine, and flow rate of boiler fuel flows. Additional details of model-variable module 104 are further described herein and in U.S. patent application Ser. No. 14/745,961 and U.S. patent application Ser. No. 14/977,785, each incorporated by reference above.

In one embodiment of the present invention, the constraint module 106 comprises a storage memory device having stored thereon processor-executable instructions for defining one or more constraints of the first-principle model of unit 102. In an exemplary embodiment, constraint module 106 defines a minimum value (e.g., 0) and a maximum value (e.g., 100) of the shaft power of a motor.

In a further embodiment, operation of a continuous process, such as those employed at industrial plants, involves several constraints based on factors such as capacity, safety, economics, and the like. For example, due to bus-bar current loading limits, there might be a constraint that either one of two motors connected to the same bus-bars can operate at a time. Similarly, constraints may exist regarding switching in either a motor or a steam turbine to meet a given load, but not both simultaneously. Additionally, there may be constraints that specify a group of units should operate simultaneously if required by the load demands and the units by themselves cannot meet the demand. In an exemplary general case, there may be a need to encode more complex operational constraints. Aspects of the present invention as further described herein provide solutions to these situations by specifying and encoding operational constraints (e.g., of a plant) through automatic grouping of model units. In an embodiment, grouping is a specification of a set of units that should be constrained to behave in a certain manner, as further described herein and U.S. patent application Ser. No. 14/977,785, incorporated by reference above.

The MINLP switch 108 of FIG. 1 comprises a storage memory device having stored thereon processor-executable instructions for implementing MINLP behavior in the first-principle model of unit 102, in an exemplary embodiment. For example, MINLP switch 108 may implement MINLP behavior in a motor model defined by unit 102 by modifying the shaft power of the motor. In an embodiment, a unit 102 including MINLP switch 108 is referred to as an MINLP unit 102. Additional details of MINLP switch 108 are further described herein and in U.S. patent application Ser. No. 14/745,961 and U.S. patent application Ser. No. 14/977,785, each incorporated by reference above. In accordance with aspects of the invention, MINLP switch 108 may be referred to as a switch component in some embodiments.

According to embodiments of the invention, process 110 is a continuous process, such as a refinery, chemical, or petrochemical plant operation, for example, and/or its control system. In an embodiment, process 110 includes at least one sensor 112. Other aspects of process 110 are further defined herein. The process definition interface 116 receives process input data 114 from a source such as a user, another software program, or a device (e.g., a sensor and/or a unit in process 110), for example. The process input data 114 represents a current state of process 110 and corresponds to the process problem to be solved. The process definition interface 116 provides the received process input data 114 to the solver system 118 for use in executing an interactive model to solve the process problem as described herein. In an exemplary embodiment, process definition interface 116 is part of a ROMEO modeling system that allows a user to construct a flowsheet of process 110 with models or units from a pre-built library or from models built by the user.

The solver system 118 comprises a storage memory device having stored thereon processor-executable instructions for defining an iterative process having variables. The variables have certain values which, when applied to the iterative process, converge the iterative process to a solution. The variables have other values, which, when applied to the iterative process, do not converge the iterative process to a solution. In one form, solver system 118 comprises a ROMEO module. In the embodiment illustrated by FIG. 1, solver system 118 includes an MINLP solver module 120 and a NLP solver module 124. The MINLP solver module 120 solves MINLP problems and the NLP solver module 124 solves nonlinear programming (NLP) problems in accordance with an embodiment of the invention. The solver system 118 is adapted for changing the value of a binary MINLP variable in order to switch unit 102 on and off in the simulation while converging to an optimal solution (e.g., optimal operating state 126) for the underlying nonlinear process 118. In an embodiment, solver system 118, including aspects thereof, generates an operating state (e.g., optimal operating state 126) based on a previous operating state of a process (e.g., process 118) when the state of MINLP switch 108 is infeasible. Commonly assigned U.S. patent application Ser. No. 13/968,119, which describes a nonlinear correction factor module for use with, for example, a ROMEO solver, is incorporated by reference in its entirety. Additional details regarding solver system 118 are further described in U.S. patent application Ser. No. 14/745,961 and U.S. patent application Ser. No. 14/977,785, each incorporated by reference above.

The feasibility evaluator oracle 122 of FIG. 1 comprises a storage memory device having stored thereon processor-executable instructions for providing an indication of whether a switching state of one or more units 102 is feasible. The oracle 122 examines one or more demands on the system to determine feasibility. For example, oracle 122 determines whether a power-balance on a shaft can be met without actually computing the power-balance in accordance with aspects of the invention. In an embodiment, oracle 122 is intended to execute before NLP solver 124 executes to solve a given node of MINLP switching. For example, when an execution of oracle 122 determines that a given node is feasible, oracle 122 returns an affirmative indication (e.g., "yes") to NLP solver 124 which will then execute to evaluate the cost of that switching. But when an execution of oracle 122 determines that a given node is infeasible, oracle 122 returns a negative indication (e.g., "no") to MINLP solver 120 thereby pruning out any further switching below the current node and NLP solver 124 will not evaluate that node. In an embodiment, oracle 122 assumes that the demand at unit 102 (e.g., at shafts or at sinks) is fixed. In another embodiment, demand at unit 102 is variable and bracketed between a known upper limit and a known lower limit. In such an embodiment, oracle 122 utilizes either the upper limit (e.g., maximum for non-generator MINLP devices) and/or the lower limit (e.g., minimum for generator MINLP devices) to provide a conservative indication of switching infeasibility. In accordance with aspects of the present invention, oracle 122 utilizes the minimum and maximum of the load of each unit 102 used for switching, the status of the MINLP switch 108 for each unit 102 (e.g., ON, OFF, continuous), the load at each shaft that has a MILNP device attached, and the minimum and maximum of sources supplying a stream when a MINLP device is attached to such stream and the load at the sinks. Additional details of oracle 122 are provided herein.

In an exemplary embodiment, at least unit model module 102 and solver system 118 comprise a control system adapted for transmitting control information to components (e.g., actuators) within process 110 and receiving sensory and feedback data from components (e.g., sensor 112) within process 110. For example, the control system and process 110 may communicate via a telecommunications network that facilitates the exchange of data, such as those that operate according to the IEEE 802.3 (e.g., Ethernet) and/or the IEEE 802.11 (e.g., Wi-Fi) protocols, for example. In another embodiment, the control system and process 110 communicate via any medium that allows data to be physically transferred through serial or parallel communication channels (e.g., copper wire, optical fiber, computer bus, wireless communication channel, etc.). In additional exemplary embodiments, the control system is one of a distributed control system (DCS) and a centralized database run in an online mode.

Figure 2:
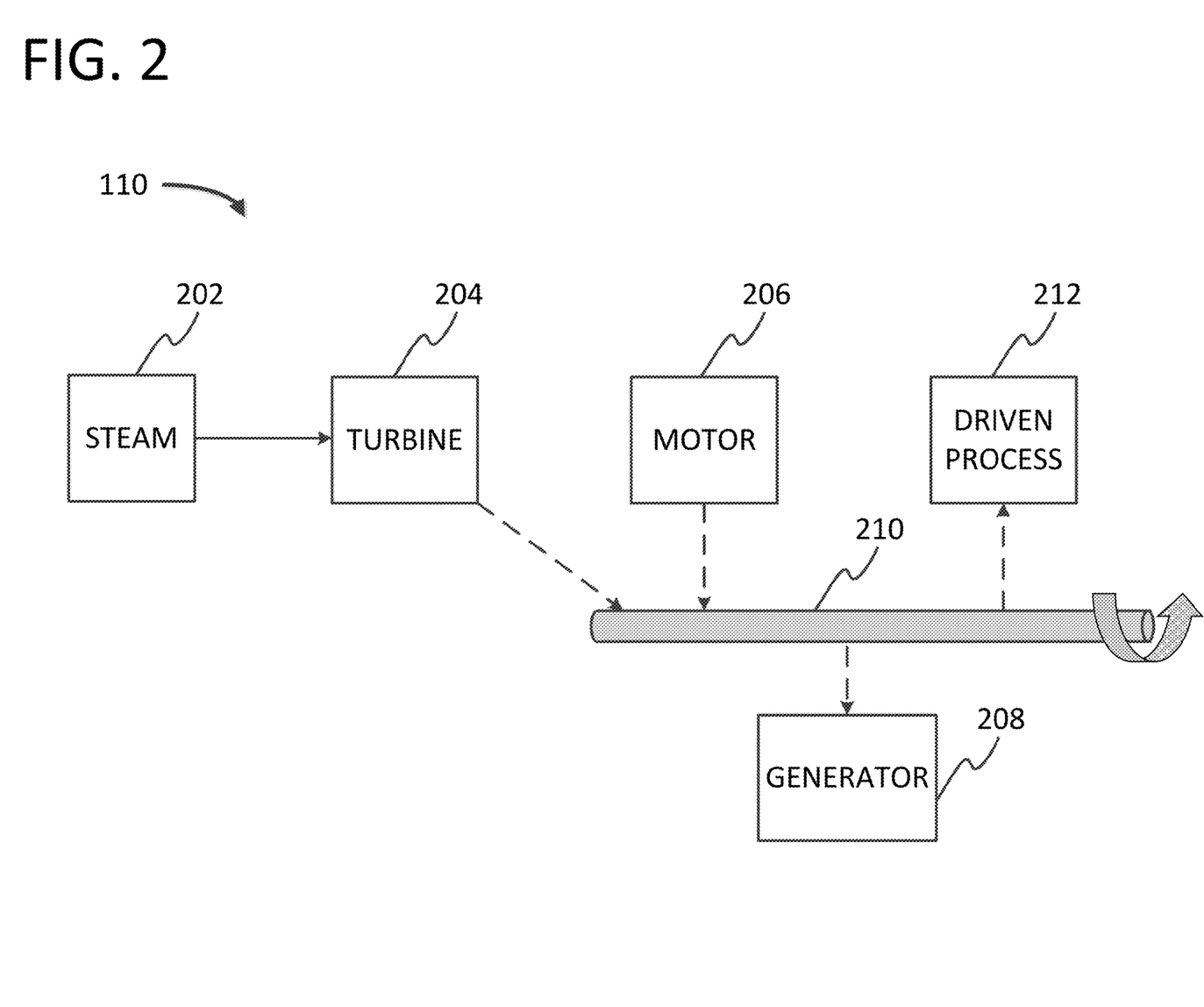
FIG. 2 is a block diagram of an exemplary continuous process embodying aspects of the invention.

FIG. 2 illustrates an exemplary process 110 including a steam source 202, a turbine 204, a motor 206, a generator 208, a shaft 210, and a driven process 212. In this exemplary embodiment, turbine 204, motor 206, and generator 208 are attached to shaft 210 that requires 20 units of work. Also in this embodiment, turbine 204 can supply 30 units of work at a cost of 300, motor 206 can supply 20 units of work at a cost of 200, and generator 208 can consume 10 units of work at a cost of −50. NLP-feasibility requires the work around shaft 210 to be balanced. Table 1 illustrates the possible states for turbine 204, motor 206, and generator 208 for the embodiment of FIG. 2.

TABLE 1

| State | Motor | Turbine | Generator | Cost | NLP Contribution | Feasibility (Difference) | Remarks |
|---|---|---|---|---|---|---|---|
| A | 0 | 0 | 0 | 0 | 0 | No (−20) | |
| B | 0 | 0 | 1 | −50 | −10 | No (−30) | |
| C | 0 | 1 | 0 | 300 | 30 | No (10) | |
| D | 0 | 1 | 1 | 250 | 20 | Yes | Suboptimal |
| E | 1 | 0 | 0 | 200 | 20 | Yes | Optimal |
| F | 1 | 0 | 1 | 150 | 10 | No (−10) | |
| G | 1 | 1 | 0 | 500 | 50 | No (−30) | |
| H | 1 | 1 | 1 | 450 | 40 | No (−20) | |

In an embodiment, each state of Table 1 is a node in a decision tree. Table 1 shows that when turbine 204 and generator 208 are on and motor 206 is off (i.e., State D) the state is feasible with a cost of 250. Table 1 also shows that when motor 206 is on and turbine 204 and generator 208 are both off (i.e., State E) the state is also feasible but with a reduced cost of 200. Thus, both State D and State E are feasible solutions, but State E is the optimal solution. Table 1 also shows that States A-C and F-H are infeasible and thus calculating the power-balance for those states results in needless complexity, time, and usage of computing resources. Aspects of the present invention prevent useless NLP evaluations.

By grouping turbine 204, motor 206, and generator 208 in accordance with U.S. patent application Ser. No. 14/977,785, infeasible switching may be prevented in accordance with aspects of the invention. For example, putting turbine 204, motor 206, and generator 208 into a single group with motor 206 marked as complement would have avoided infeasible States A-C and F-H. Table 2 illustrates the three independent binary variables (e.g., turbine 204, motor 206, generator 208) collapsed to just one independent group leader binary variable with motor 206 serving as the group leader.

TABLE 2

| Motor (Group Leader) | Turbine | Generator | Cost | Contribution | NLP Feasibility | Remarks |
|---|---|---|---|---|---|---|
| 0 | 1 | 1 | 250 | 20 | Yes | Suboptimal |
| 1 | 0 | 0 | 200 | 20 | Yes | Optimal |

When grouping is scaled up to a large number of devices, it may become increasingly difficult for a user to cover all feasible switching states using grouping alone, which may lead to infeasible branches for MINLP with potential robustness issues and wasted computation time. Aspects of oracle 122 alleviate these concerns by providing an indication of whether a switching state is feasible without actually computing the power-balance.

The following provides a generic mathematical description for oracle 122 and further details of oracle 122 are provided herein. In an embodiment, the load to be serviced at a given shaft is represented as L. Equation 2 represents a power-balance at the shaft, assuming all MINLP devices connected to the shaft are known.

$$F = \sum_{i=1}^{N_{devices}} D_i P_i - L \quad \text{(Equation 2)}$$

When F=0 then the solution is feasible and when F is non-zero then the solution is infeasible. Device switch $D_i$ is either 0 or 1 based on each device's switching state, which has a relation to its group leader based on its complement. Power $P_i$ is the power contributed by the device, which is positive for a motor or a turbine, but negative for a generator. In an embodiment in which the switch is considered as a continuum for a node, $D_i=1$ for Equation 2. There may exist embodiments that are more complex than situations Equation 2 can handle. For example, when units that do not have MINLP capability are connected to a shaft, Equation 2 must be partitioned appropriately for units that are fixed and those that can be switched. Moreover, switchable devices may be varied over a range of loads, between a minimum and a maximum, and otherwise supply no power. In such embodiments, feasibility becomes a containment problem (i.e., given a range, determine whether the load can be met). The oracle 122 handles such embodiments by determining whether the power-balance can be met using the provided ranges (i.e., is feasible or infeasible) without actually computing the power-balance.

Figure 3:
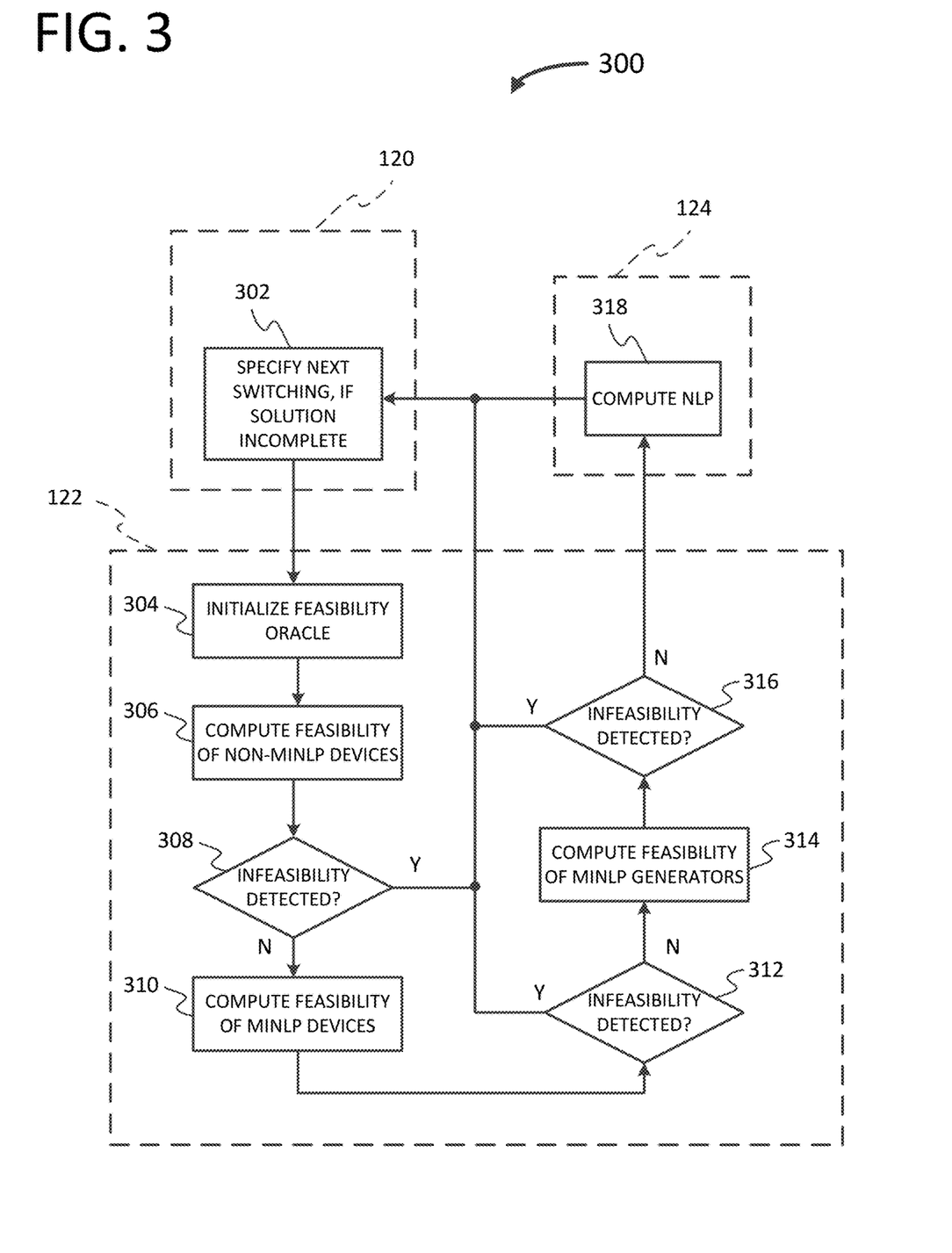
FIG. 3 is a flow chart illustrating an exemplary workflow process of considering only feasible spaces embodying aspects of the invention.

FIG. 3 illustrates a sample workflow process 300 in a ROMEO-based solver system for determining feasibility. In an embodiment, the process 300 comprises a three-stage computation at a shaft (e.g., shaft 210). At step 302, MINLP solver module 120 specifies a next switching state when a solution is incomplete. The oracle 122 is initialized at step 304. In an embodiment, initialization is a one-time occurrence. In another embodiment, initialization includes obtaining data representing the minimum and maximum range of loads for a device, a status of the device, and/or a current load on the device. The oracle 122 determines the feasibility of non-MINLP devices at step 306. In an embodiment, oracle 122 computes Equation 3 during step 306.

$$F_1 = \sum_{k=1}^{N_{non-MINLP\ devices}} P_k - L \quad \text{(Equation 3)}$$

where $F_1$ is the feasibility of the non-MINLP devices, $P_k$ is the power contributed by the k-th device and L is the load to be serviced at the shaft. At step 308, oracle 122 determines whether $F_1$ is infeasible. When $F_1$ is greater than zero, the solution is infeasible. Either L should increase by a shift in the process equilibrium or the problem is infeasible.

When the solution is infeasible, process 300 continues back to step 302. When $F_1$ is less than or equal to zero in Equation 3, oracle 122 does not detect infeasibility and process 300 continues to step 310.

At step 310, oracle 122 determines the feasibility of MINLP devices. In an embodiment, oracle 122 computes Equation 4 during step 310.

$$F_2 = F_1 + \Sigma_{i=1}^{NMINLP\ devices} D_i P_i^{MAX} \quad \text{(Equation 4)}$$

where $D_i$ is the device switch for the i-th device and $P_i^{MAX}$ is the maximum load of the i-th device. At a given node of MINLP, all of the device switch variables $D_i$ are known, and are either 0 or 1 (continuum switches have D=1). In an embodiment, Equation 4 does not contain any generators. The oracle 122 determines whether infeasibility is detected via Equation 4 at step 312. When $F_2$ is negative the solution is infeasible and process 300 returns to step 302. When $F_2$ is non-negative the solution is feasible and process 300 continues to step 314.

At step 314, oracle 122 determines the feasibility of MINLP generators on the shaft turned on (e.g., D=1). In an embodiment, oracle 122 computes Equation 5 during step 314.

$$F_3 = F_2 - \Sigma_{i=1}^{NMINLP\ generators} D_i P_i^{MIN} \quad \text{(Equation 5)}$$

where $D_i$ is the device switch for the i-th generator and $P_i^{MIN}$ is the minimum load of the i-th generator. The negative sign in front of the summation is necessary because the generators increase the load. At step 316, oracle 122 determines whether infeasibility is detected by Equation 5. When $F_3$ is negative, it implies an imbalance at the shaft and therefore the switching is infeasible. In this case, process 300 returns to step 302 without calculating any other shaft. When $F_3$ is positive or zero, the switching is feasible. When all shafts return such feasibility, process 300 continues to step 318 where NLP solver 124 computes the NLP solution at that node.

Referring further to FIG. 3, oracle 122 provides a conservative determination of infeasibility because such determination results in a pruning of that branch and a false determination degrades performance. One having ordinary skill in the art will understand that if oracle 122 makes a determination of feasibility but is wrong, NLP solver module 124 will still catch the infeasibility, albeit at a greater cost. In an embodiment, a feasibility heuristic according to process 300 is applicable to cases in which the horsepower of the loads at shafts are fixed and/or variable within known limits. In another embodiment, process 300 is applicable in cases of stream switching in which the sinks have fixed flows or flows within known limits. In yet another embodiment, aspects of oracle 122 that perform process 300 are controlled using a parameter of MINLP solver module 120. Aspects of oracle 122 thus improve the efficiency, performance, and robustness of solver system 118.

Figure 4:
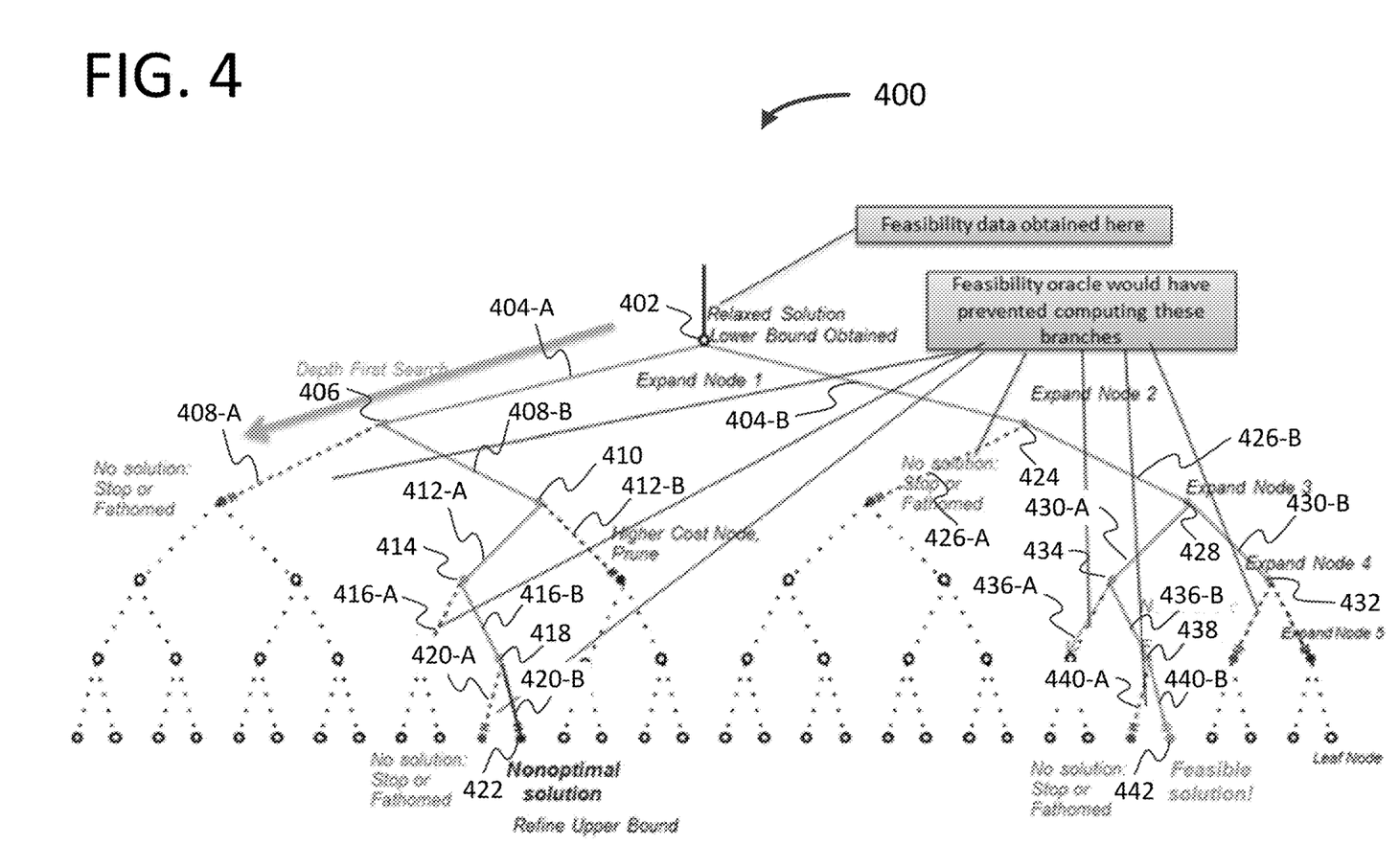
FIG. 4 is an illustration of an exemplary decision tree representing possible solutions in accordance with aspects of the invention.

FIG. 4 illustrates an exemplary decision tree 400 in accordance with aspects of the invention. In an embodiment, decision tree 400 corresponds to Equation 5 in which each node corresponds to a NLP problem (e.g., restriction) and each edge corresponds to a branching decision (e.g., steps 308, 312, 316 in process 300). As shown, oracle 122 obtains feasibility data at node 402 and performs a depth-first search by selecting branch 404-A. Selecting branch 404-A leads to node 406. In an exemplary embodiment, process 300 is performed by solver system 118 at node 406. The oracle 122 executing according to the embodiment of process 300 determines that the node that would result from selecting branch 408-A is infeasible and thus the nodes that would follow from that node are also infeasible. Accordingly, branch 408-A is pruned (e.g., fathomed) such that the nodes resulting from that branch are never solved thereby resulting in reduced time finding a feasible solution. In the operation of process 300, pruning a branch corresponds to detecting infeasibility at steps 308, 312, and/or 316 and returning to step 302.

Referring again to FIG. 4, selecting branch 408-B leads to node 410 where oracle 122 determines that selecting branch 412-B has a higher cost than the initial cost, as further described herein. The oracle 122 thus selects branch 412-A which leads to node 414. The node that would result from selecting branch 416-A is infeasible and thus that branch is pruned. The oracle 122 selects branch 416-B to reach node 418. The oracle again determines that selecting branch 420-A would result in an infeasible node so it selects branch 420-B. The branch 420-B leads to a solution at node 422 that is feasible but non-optimal.

The oracle 122 returns to node 402 to select branch 404-B which leads to node 424. At node 424, oracle 122 determines that branch 426-A would result in an infeasible solution. The oracle 122 selects branch 426-B which leads to node 428. Selecting branch 430-B leads to node 432, but both branches at node 432 are infeasible so oracle 122 thus selects branch 430-A which leads to node 434. The oracle 122 determines that selecting branch 436-A would lead to an infeasible solution so it selects branch 436-B which leads to node 438. At node 438, oracle 122 determines that selecting branch 440-A leads to another infeasible solution. The oracle 122 thus selects branch 440-B which leads to a solution at node 442 that is feasible and is the optimal solution.

Figure 5:
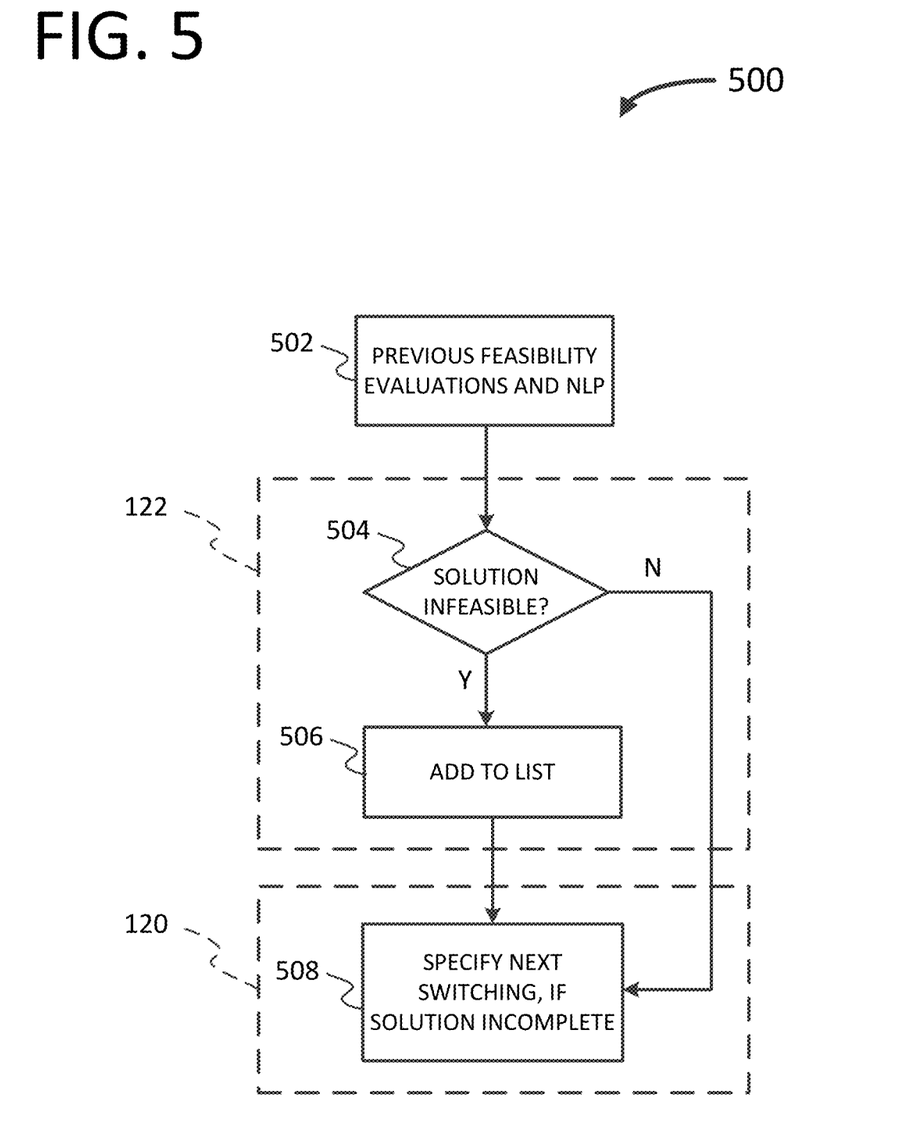
FIGS. 5 and 6 are flow charts illustrating exemplary workflow processes of automatically generating feasible paths embodying aspects of the invention.

FIG. 5 illustrates another sample workflow process 500 in a ROMEO-based solver system for automatic generation of a feasible path by oracle 122. In an embodiment, the number of switchable devices in a continuous process (e.g., process 110) may not change over time due to large capital costs, for example. In this embodiment, the loading and cost of energy will change more frequently than the number of switchable devices. They types of switching may vary greatly and include loading, energy costs, start-up costs, and shutdown costs. In such processes with stable operations, results determined by MILNP solver module 120 will tend to resemble past solutions and MINLP solver module 120 is expected to find similar infeasible paths each time it executes. In such cases, performance of a solver system can be enhanced by keeping track of infeasible paths and avoiding those paths in future executions.

In an embodiment, aspects of the invention utilize logical constraints to avoid infeasible paths during an execution. The oracle 122 in this embodiment is a heuristic that utilizes a memory of infeasible paths at the solver level and performs NLP only for switching states that are permitted by not being on the list. The process 500 proceeds from previous feasibility evaluations and NLP evaluations at step 502 to a determination by oracle 122 of whether the current solution is feasible at step 504. As an example, consider State F in Table 1 in which turbine 204 being off and both motor 206 and generator 208 being on results in an infeasible solution. In this embodiment, oracle 122 seeks to invalidate this switching state in future executions when Equation 6 is true.

$$M\overline{T}G = 0 \quad \text{(Equation 6)}$$

where $\overline{T} = (1-T)$. In the embodiment, oracle 122 adds Equation 6 as an automatically generated logical cut to a list of such cuts that is remembered at the solver-level (e.g., solver system 118) rather than the model-level (e.g., unit 102) at step 506. A list of cuts is preferably stored on a storage memory device. In accordance with aspects of the invention, the list-based automatic generation of feasible paths by oracle 122 operates at the group level rather than on individual devices. The constraint in Equation 6 reduces to the feasible space as shown in Table 3.

TABLE 3

| Motor | Turbine | Generator | M(1 − T)G | Feasibility |
|---|---|---|---|---|
| 0 | 0 | 0 | 0 | Yes |
| 0 | 0 | 1 | 0 | Yes |
| 0 | 1 | 0 | 0 | Yes |
| 0 | 1 | 1 | 0 | Yes |
| 1 | 0 | 0 | 0 | Yes |
| 1 | 0 | 1 | 1 | No |
| 1 | 1 | 0 | 0 | Yes |
| 1 | 1 | 1 | 0 | Yes |

After step 506, process 508 proceeds to step 508 in which MINLP solver module 120 specifies the next switching state if the solution is incomplete. When the solution is not infeasible (i.e., the solution is feasible) process 500 continues directly to step 508. In an embodiment, aspects of oracle 122 that perform process 500 are controlled using a parameter of MINLP solver module 120. Aspects of oracle 122 thus improve the efficiency, performance, and robustness of solver system 118.

Figure 6:
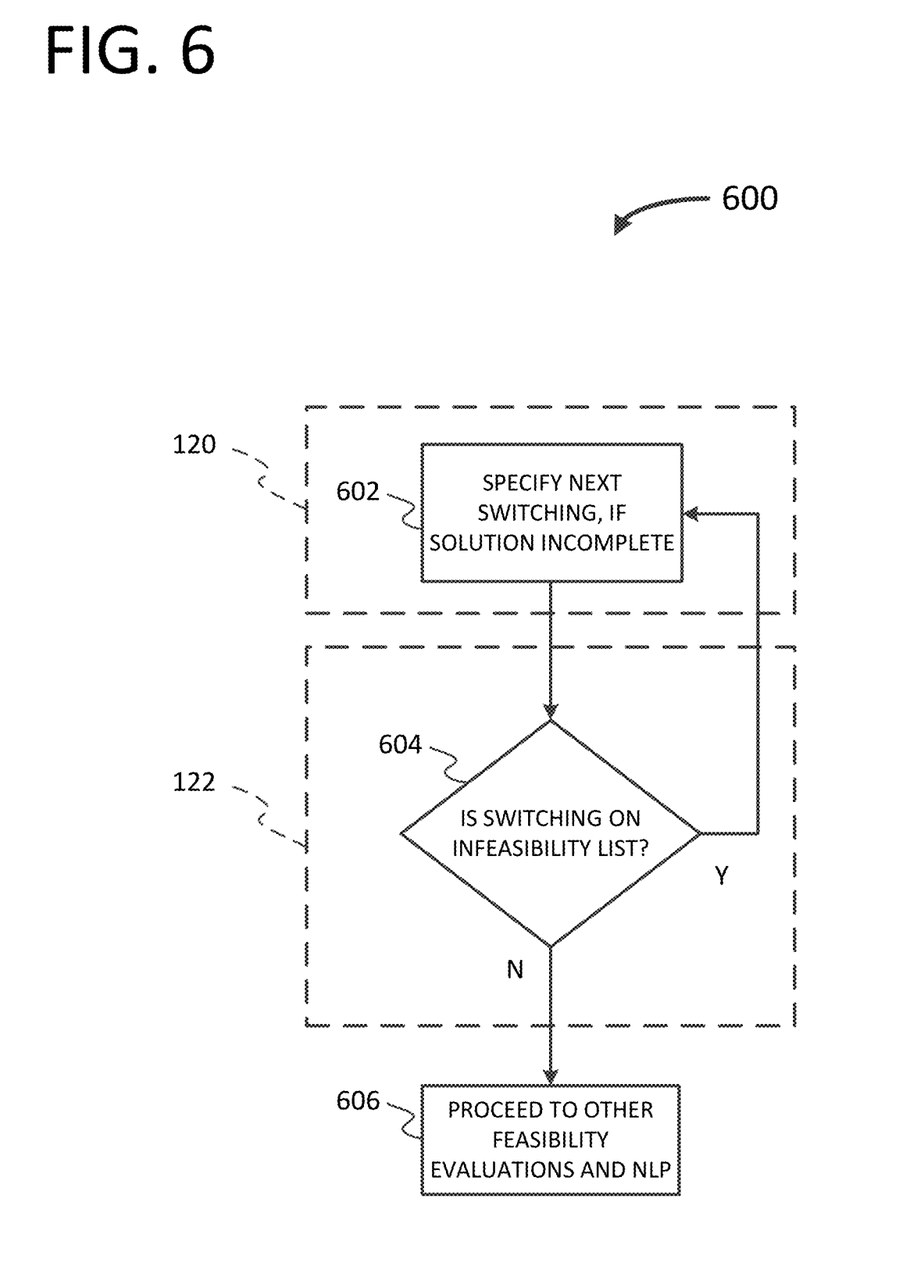

FIG. 6 illustrates a sample workflow process 600 in a ROMEO-based solver system for utilization of a list of infeasible switching states by oracle 122. At step 602, MINLP solver module 120 issues a new node for NLP evaluation if the solution is incomplete. At step 604, oracle 122 checks this node against the list of cuts to determine whether the switching is infeasible. For example, if the new node includes a switching that is included in the stored list, then the switching is infeasible and process 600 returns to step 602. If the new node includes a switching that is not included in the stored list, then the switching is not infeasible and process 600 proceeds to other feasibility evaluations and NLP evaluations at step 606. In an embodiment, aspects of oracle 122 that perform process 600 are controlled using a parameter of MINLP solver module 120. Aspects of oracle 122 thus improve the efficiency, performance, and robustness of solver system 118.

Figure 7:
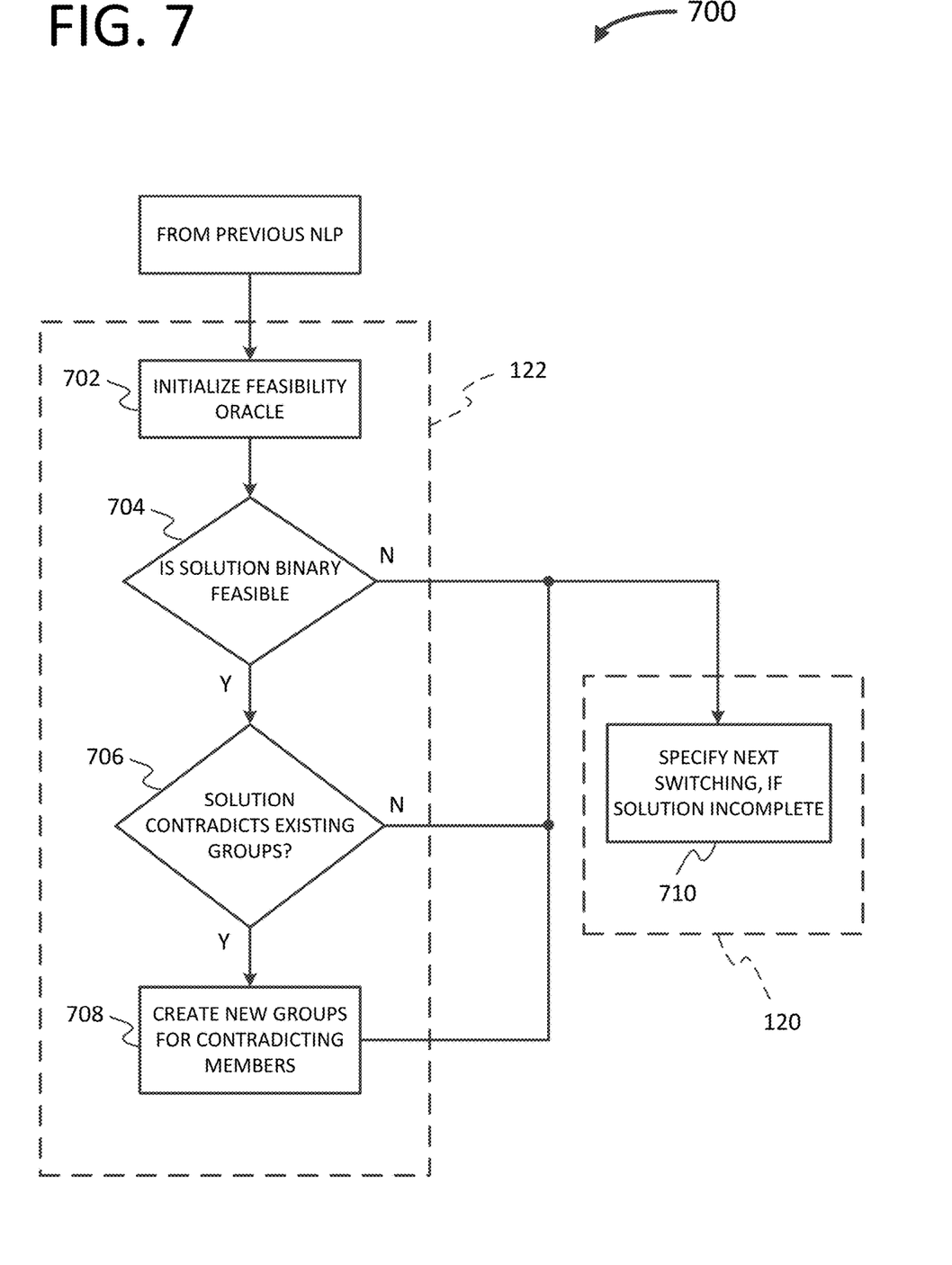
FIG. 7 is a flow chart illustrating an exemplary workflow process of automatically generating groupings in accordance with aspects of the invention.

FIG. 7 illustrates a sample workflow process 700 in a ROMEO-based solver system for automatic generation of groups of units 102 by oracle 122. In accordance with aspects of the invention, oracle 122 automatically generates groups of units 102 to alleviate challenges of manually creating groups when the number of switchable devices increases. In an embodiment, a user may specify one or more groups involving a few units 102 while leaving the rest of the devices in their own default groups in accordance with U.S. patent application Ser. No. 14/977,785, incorporated above by reference. Aspects of the present invention group the remaining units 102 in such a manner that feasible solutions are not excluded. In an embodiment, when the first feasible solution is found (e.g., all binary variables equal to zero or one) oracle 122 puts all ungrouped binary variables in a single group, including complements as necessary to represent the first feasible solution. As the solution process proceeds, additional feasible solutions are utilized by oracle 122 to refine the group by partitioning it into two groups. In other words, oracle 122 moves the set members that face contraction at the new solution to a new group in which there is no contradiction between members. The process of partitioning continues with each feasible solution found. In the worst case, there will be as many partitions as the default groups. In the best case, there will be just one new group.

As an example, consider the decision tree 400 illustrated by FIG. 4. In this example, each left side branch (e.g., those having an "-A" suffix) is a logical "0" and each right side branch (e.g., those having a "-B" suffix) is a logical "1". When oracle 122 reaches the non-optimal but feasible solution at node 422, oracle 122 creates a group of binary variables to represent that solution. The group for node 422 is represented by Group (a):

$$\{-x1, x2, -x3, x4, x5\} \quad (a)$$

wherein a negative sign correlates to a complement in the group. When oracle 122 reaches the optimal solution at node 442, oracle 122 creates another group of binary variables to represent the solution (e.g., according to process 700 described herein). The group for node 442 is represented by temporary Group (b):

$$\{x1, x2, -x3, x4, x5\} \quad (b)$$

When comparing the two groups, oracle 122 determines that there is a contradiction for the x1 variable but the other variables satisfy both groups. The oracle 122 then partitions Group (a) into two sets (e.g., groups) represented by Group (c):

$$\{x1\} \text{ and } \{x2, -x3, x4, x5\} \quad (c)$$

The oracle 122 uses these partitions in Group (c) which has two consistent groups for the discovered feasible solutions. If additional solutions result in further contradictions, oracle 122 proceeds to partition the groups accordingly.

Referring further to FIG. 7, process 700 begins with oracle 122 initializing at step 702. At step 704, oracle 122 determines whether the solution is binary feasible. When oracle 122 determines the solution is not binary feasible, process 700 continues to step 710 in which MINLP solver module 120 specifies the next switching state if the solution is incomplete. When oracle 122 determines the solution is binary feasible, process 700 continues to step 706. Referring to the above example, oracle 122 would determine binary feasibility at nodes 422 and 442 (FIG. 4). At step 706, oracle 122 determines whether the current solution contradicts an existing group. When oracle 122 determines the solution does not contradict any existing groups, process 700 continues to step 710. When oracle 122 determines the solution does contradict an existing group, process 700 continues to step 708. Referring to the above example, oracle 122 would determine the solution represented by Group (b) contradicts the solution represented by Group (a). At step 708, oracle 122 creates new groups for contradicting members before advancing to step 710. Referring again to the above example, oracle 122 would create Group (c) at step 708.

In an embodiment, oracle 122 executing in accordance with the embodiment of process 700 permits the automatic generation of grouping constraints by studying the history of solutions. In another embodiment, oracle 122 learns from valid solutions. In yet another embodiment, aspects of oracle 122 that perform process 700 are controlled using a parameter of MINLP solver module 120 that will disable such behavior if user-requested.

Figure 8:
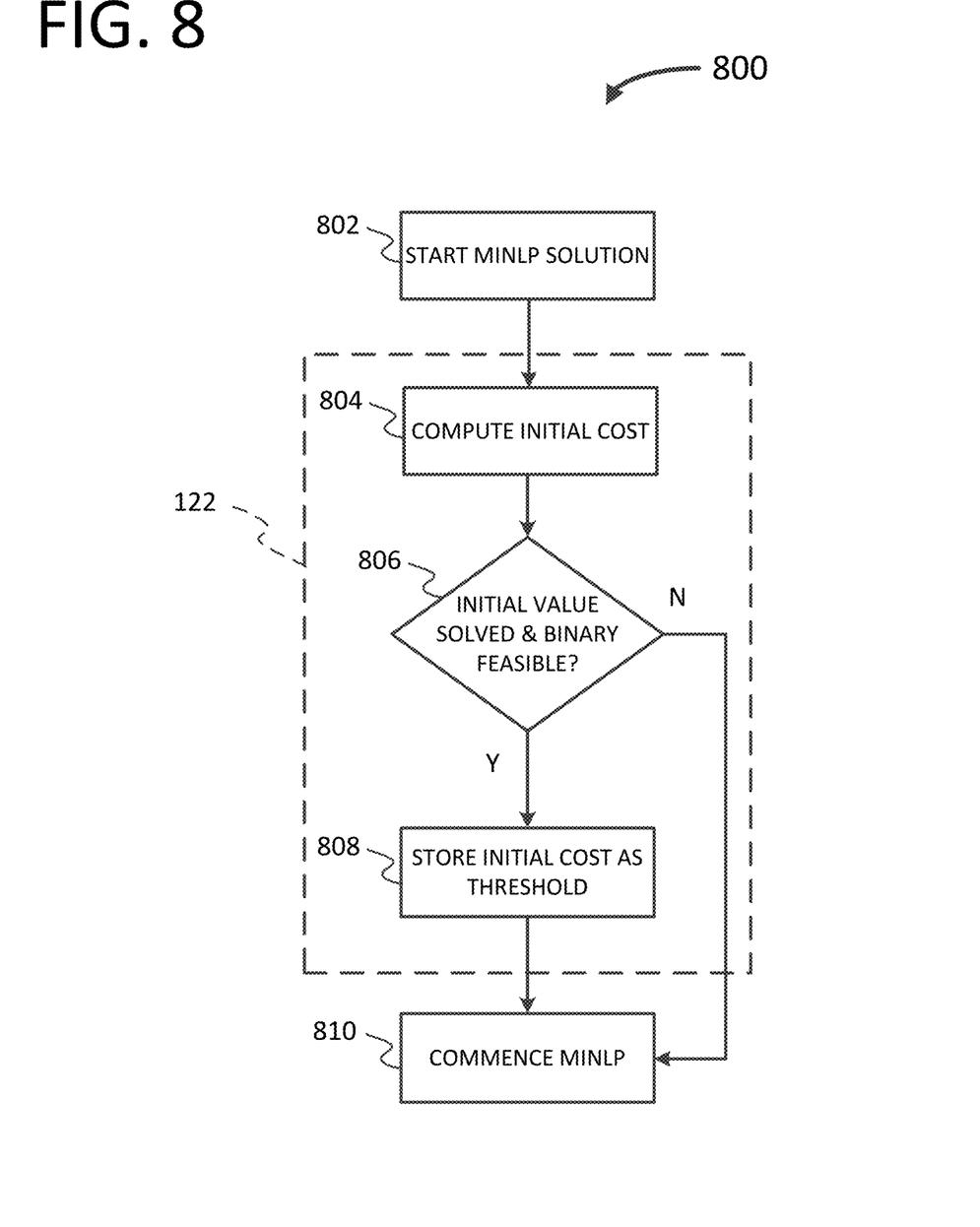
FIGS. 8 and 9 are flow charts illustrating exemplary workflow processes of reducing a search space based on initial feasibility in accordance with aspects of the invention.

FIG. 8 illustrates yet another sample workflow process 800 in a ROMEO-based solver system for using an initial feasibility cost. In accordance with aspects of the invention, the initial state of a continuous process (e.g., process 110) is in either an ON state or an OFF state. The initial state is a feasible solution for the MINLP problem because the process is already in that state. It could be in this state, for example, as a consequence of an MINLP optimization performed during a previous cycle. Aspects of the present invention complete a MINLP optimization in less time than conventional solutions by pruning nodes that have higher costs than the initial solution. A MINLP solution is started at step 802. At step 804, oracle 122 computes the cost at the initial state. In an embodiment, oracle 122 assumes that the constraints are closed (e.g., the process is at a valid solution) and all integer variables are at integer values. At step 806, oracle 122 determines whether the initial value is solved and is binary feasible. When oracle 122 determines that either the initial value is not solved or is not binary feasible at step 806, process 800 continues to step 810 in which MINLP solver module 120 commences execution. When oracle 122 determines that the initial value is solved and is binary feasible at step 806, process 800 continues to step 808. At step 808, oracle 122 stores the initial cost computed in step 804 as a threshold value before continuing to step 810. In an embodiment, the initial cost is stored as a threshold on a memory storage device.

Figure 9:
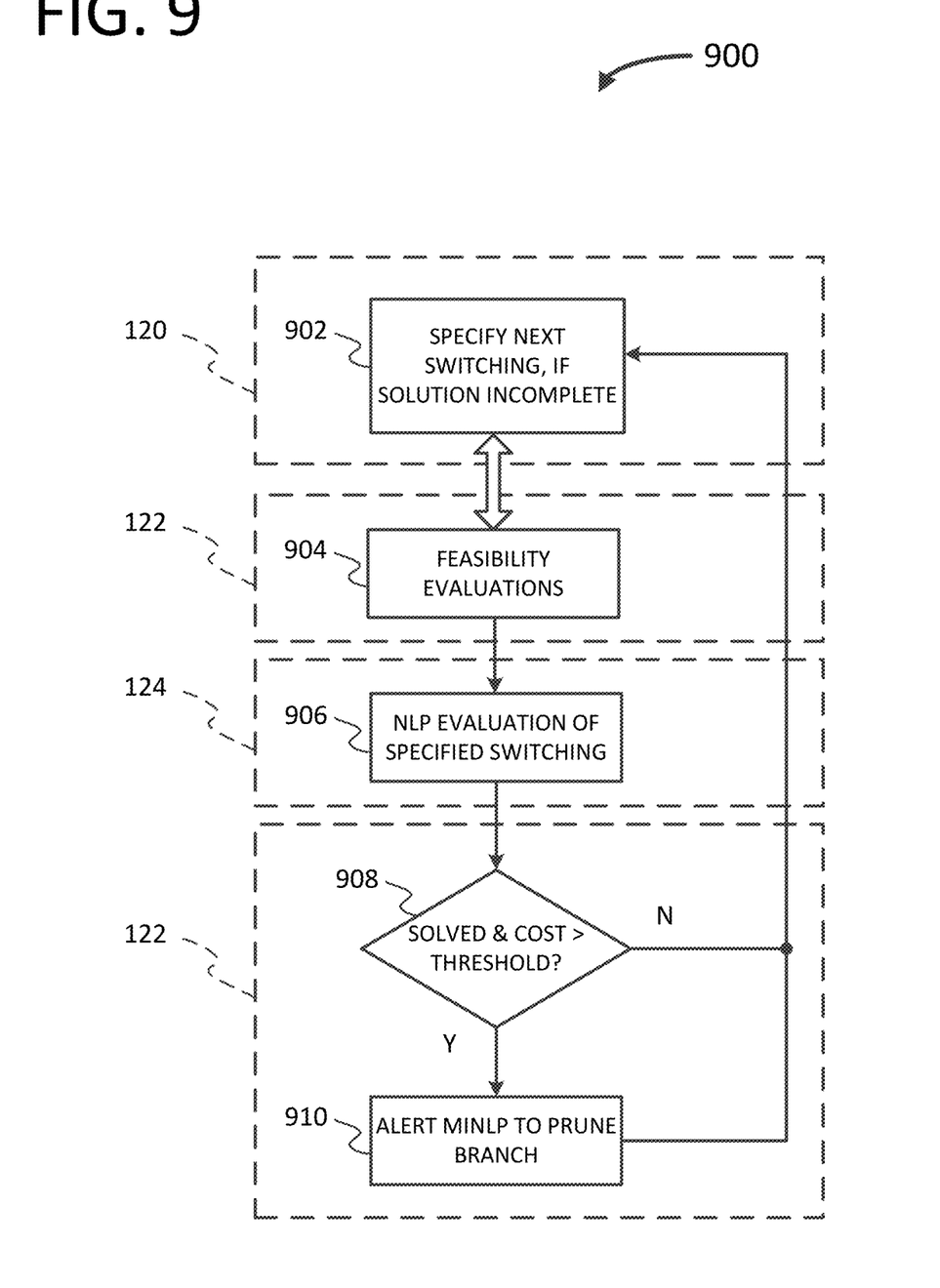

FIG. 9 illustrates a sample workflow process 900 in a ROMEO-based solver system for using an initial feasibility cost to prune branches with a higher cost than the initial cost. At step 902, MINLP solver module 120 issues a new node for NLP evaluation if the solution is incomplete. Oracle 122 then performs feasibility evaluations at step 904. NLP solver module 124 performs an NLP evaluation of the specified switching at step 906. At step 908, oracle 122 determines whether the state has been solved and the cost is greater than the threshold. When either the state has not been solved or the cost is less than the threshold, process 900 returns back to step 902. When the state has been solved and the cost is greater than the threshold, process 900 continues to step 910. At step 910, oracle 122 alerts MINLP solver module 120 to prune the branch before returning back to step 902.

Referring again to FIG. 4, decision tree 400 illustrates aspects of steps 908 and 910 of process 900. For example, oracle 122 executing according to process 900 at node 410 may determine that branch 412-B has a higher cost than the threshold cost at step 908. The oracle 122 alerts MINLP solver module 120 to prune branch 412-B and MINLP solver module 120 specifies the next switching (e.g., branch 412-A).

In an embodiment, process 900 utilizes the cost computed in process 800 as a "best so far" cost which is used to prune higher cost nodes. In this manner, the search is restricted to only those nodes that have potential as lower cost nodes which improves the efficiency and performance of the MINLP solution.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system, comprising:
one or more sensors configured to provide current state data representing a current state of each of a plurality of process units; and
a control system configured to receive the current state data and configured to generate an operating state of each of a plurality of process units based thereon, the control system comprising a processor executing computer-executable instructions, the instructions configured to implement:
a plurality of model components implementing at least one first-principle equation, wherein the first-principle equation represents at least one of the process units, and wherein one or more of the plurality of model components comprise a group;
a plurality of switch components each comprising a corresponding one of the plurality of model components and each implementing a mixed integer non-linear programming (MINLP) behavior of the corresponding model component;
a MINLP solver component configured to specify a switching state from a plurality of switching states, the switching states each corresponding to an operational status of the plurality of model components; and
an oracle component configured to provide an infeasibility indication to the MINLP solver component as a function of the demands for indicating whether the specified switching state is infeasible; and
a nonlinear programming (NLP) solver component configured to generate the operating state of each of a plurality of process units,
wherein the operating state is optimized in accordance with one or more constraints in response to receiving an indication from the oracle component that the specified switching state is feasible.

2. The system of claim 1,
wherein the oracle component is further configured to:
compute a non-MINLP feasibility of one or more non-MINLP process units of the plurality of process units;
compute a MINLP non-generator feasibility of one or more MINLP non-generator process units of the plurality of process units and the non-MINLP feasibility; and
compute a MINLP generator feasibility of one or more MINLP generator process units of the plurality of process units and the MINLP non-generator feasibility, wherein the infeasibility indication is based on the non-MINLP feasibility, the MINLP non-generator feasibility, and the MINLP generator feasibility.

3. The system of claim 2,
wherein the oracle component is further configured to provide an infeasible indication when the non-MINLP feasibility is greater than zero,
wherein the oracle component is further configured to provide the infeasible indication when the MINLP non-generator feasibility is less than zero, and wherein the oracle component is further configured to provide the infeasible indication when the MINLP generator feasibility is one of zero and greater than zero.

4. The system of claim 2,
wherein the plurality of process units include a shaft, and wherein a demand at the shaft is fixed.

5. The system of claim 2,
wherein the plurality of process units include a shaft,
wherein a demand at the shaft is variable within a lower limit and an upper limit,
wherein the oracle component is further configured to compute the MINLP non-generator feasibility based at least in part on the upper limit, and
wherein the oracle component is further configured to compute the MINLP generator feasibility based at least in part on the lower limit.

6. The system of claim 2,
wherein the plurality of process units includes a stream,
wherein a source supplying the stream is variable within a lower limit and an upper limit,
wherein the oracle component is further configured to compute the non-MINLP feasibility based at least in part on a load at a sink of the stream,
wherein the oracle component is further configured to compute the MINLP non-generator feasibility based at least in part on the upper limit, and
wherein the oracle component is further configured to compute the MINLP generator feasibility based at least in part on the lower limit.

7. The system of claim 1,
wherein the oracle component is further configured to generate and maintain a list of infeasible switching states, and wherein the infeasibility indication is based at least in part on the list.

8. The system of claim 1,
wherein the oracle component is further configured to group one or more of the plurality of model components into the group,
wherein each model component of the group does not contradict any other model component of the group, and
wherein the infeasibility indication is based at least in part on the group.

9. The system of claim 1,
wherein the oracle component is further configured to determine whether a cost of the specified switching state is greater than a cost of the current state, and
wherein the infeasibility indication is based at least in part on the determination.

10. A system, comprising:
one or more sensors configured to provide current state data representing a current state of each of a plurality of process units; and
a control system configured to receive the current state data and configured to generate an operating state of each of a plurality of process units based thereon, the control system comprising a processor executing computer-executable instructions, the instructions configured to implement:
a plurality of model components implementing at least one first-principle equation, wherein the first-principle equation represents at least one of the process units, and wherein one or more of the plurality of model components comprise a group;
a plurality of switch components each comprising a corresponding one of the plurality of model components and each implementing a mixed integer nonlinear programming (MINLP) behavior of the corresponding model component;

a MINLP solver component configured to specify a switching state from a plurality of switching states, the switching states each corresponding to an operational status of the plurality of model components; and an oracle component configured to:
provide an infeasibility indication to the MINLP solver component as a function of the demands for indicating whether the specified switching state is infeasible,
compute a non-MINLP feasibility of one or more non-MINLP process units of the plurality of process units,
compute a MINLP non-generator feasibility of one or more MINLP non-generator process units of the plurality of process units and the non-MINLP feasibility, and
compute a MINLP generator feasibility of one or more MINLP generator process units of the plurality of process units and the MINLP non-generator feasibility, wherein the infeasibility indication is based on the non-MINLP feasibility, the MINLP non-generator feasibility, and the MINLP generator feasibility;

wherein the plurality of process units includes a stream,
wherein a source supplying the stream is variable within a lower limit and an upper limit,
wherein the oracle component is further configured to compute the non-MINLP feasibility based at least in part on a load at a sink of the stream,
wherein the oracle component is further configured to compute the MINLP non-generator feasibility based at least in part on the upper limit, and
wherein the oracle component is further configured to compute the MINLP generator feasibility based at least in part on the lower limit.

11. The system of claim 10,
wherein the oracle component is further configured to provide an infeasible indication when the non-MINLP feasibility is greater than zero,
wherein the oracle component is further configured to provide the infeasible indication when the MINLP non-generator feasibility is less than zero, and
wherein the oracle component is further configured to provide the infeasible indication when the MINLP generator feasibility is one of zero and greater than zero.

12. The system of claim 10,
wherein the oracle component is further configured to provide an infeasible indication when the non-MINLP feasibility is greater than zero,
wherein the oracle component is further configured to provide the infeasible indication when the MINLP non-generator feasibility is less than zero, and
wherein the oracle component is further configured to provide the infeasible indication when the MINLP generator feasibility is one of zero and greater than zero.

13. The system of claim 10,
wherein the plurality of process units include a shaft, and
wherein a demand at the shaft is fixed.

14. The system of claim 10,
wherein the plurality of process units include a shaft,
wherein a demand at the shaft is variable within a lower limit and an upper limit,
wherein the oracle component is further configured to compute the MINLP non-generator feasibility based at least in part on the upper limit, and
wherein the oracle component is further configured to compute the MINLP generator feasibility based at least in part on the lower limit.

15. The system of claim 10,
wherein the oracle component is further configured to generate and maintain a list of infeasible switching states, and
wherein the infeasibility indication is based at least in part on the list.

16. The system of claim 10,
wherein the oracle component is further configured to group one or more of the plurality of model components into the group,
wherein each model component of the group does not contradict any other model component of the group, and
wherein the infeasibility indication is based at least in part on the group.

17. The system of claim 10,
wherein the oracle component is further configured to determine whether a cost of the specified switching state is greater than a cost of the current state, and
wherein the infeasibility indication is based at least in part on the determination.

* * * * *